(12) United States Patent
Sammour et al.

(10) Patent No.: US 12,273,811 B2
(45) Date of Patent: *Apr. 8, 2025

(54) METHOD AND APPARATUS FOR ENHANCING DISCONTINUOUS RECEPTION IN WIRELESS SYSTEMS

(71) Applicant: InterDigital Technology Corporation, Wilmington, DE (US)

(72) Inventors: Mohammed Sammour, Alrabieh-Amman (JO); Arty Chandra, Roslyn, NY (US); Jin Wang, Princeton, NJ (US); Shankar Somasundaram, Sunnyvale, CA (US)

(73) Assignee: InterDigital Technology Corportion, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,939

(22) Filed: Jan. 17, 2024

(65) Prior Publication Data
US 2024/0155485 A1 May 9, 2024

Related U.S. Application Data

(63) Continuation of application No. 18/156,738, filed on Jan. 19, 2023, now Pat. No. 11,910,311, which is a (Continued)

(51) Int. Cl.
*H04W 4/00* (2018.01)
*H04W 52/02* (2009.01)
(Continued)

(52) U.S. Cl.
CPC ... *H04W 52/0206* (2013.01); *H04W 52/0216* (2013.01); *H04W 52/0229* (2013.01);
(Continued)

(58) Field of Classification Search
CPC . H04W 24/00; H04W 48/16; H04W 52/0216; H04W 52/0245; Y02D 30/70
See application file for complete search history.

(56) References Cited

U.S. PATENT DOCUMENTS 4,248,922 A  2/1981 Shortway et al.
4,291,097 A  9/1981 Kamada et al.
(Continued)

FOREIGN PATENT DOCUMENTS

CN  1222271 A  7/1999
CN  101297565 A  8/2006
(Continued)

OTHER PUBLICATIONS

3rd Generation Partnership Project (3GPP), "Active Mode DRX", R2-062752, Nokia, 3GPP TSG-RAN WG2 Meeting #55, Oct. 2006, Seoul, Korea, 3 pages.
(Continued)

*Primary Examiner* — Phuc H Tran
(74) *Attorney, Agent, or Firm* — Flaster Greenberg, P.C.

(57) ABSTRACT

A method of discontinuous reception (DRX) in a wireless transmit receive unit (WTRU) includes the WTRU receiving DRX setting information over a radio resource control (RRC) signal, and the WTRU receiving DRX activation information over medium access control (MAC) signal.

20 Claims, 6 Drawing Sheets

Related U.S. Application Data continuation of application No. 16/848,613, filed on Apr. 14, 2020, now Pat. No. 11,678,263, which is a continuation of application No. 16/163,290, filed on Oct. 17, 2018, now Pat. No. 10,667,211, which is a continuation of application No. 15/336,258, filed on Oct. 27, 2016, now Pat. No. 10,165,606, which is a continuation of application No. 14/717,145, filed on May 20, 2015, now Pat. No. 9,510,390, which is a continuation of application No. 13/526,104, filed on Jun. 18, 2012, now Pat. No. 9,066,350, which is a continuation of application No. 11/924,484, filed on Oct. 25, 2007, now Pat. No. 8,228,829.

(60) Provisional application No. 60/863,185, filed on Oct. 27, 2006.

(51) Int. Cl.
  *H04W 72/20* (2023.01)
  *H04W 76/20* (2018.01)
  *H04W 76/28* (2018.01)

(52) U.S. Cl.
  CPC .......... *H04W 72/20* (2023.01); *H04W 76/20* (2018.02); *H04W 76/28* (2018.02); *Y02D 30/70* (2020.08)

(56) References Cited

U.S. PATENT DOCUMENTS

| | | | |
|---|---|---|---|
| 5,532,113 | A | 7/1996 | Frechet et al. |
| 5,745,860 | A | 4/1998 | Kallin |
| 6,028,153 | A | 2/2000 | Jung |
| 6,284,321 | B1 | 9/2001 | Brindoepke et al. |
| 6,344,307 | B1 | 2/2002 | Kojima et al. |
| 6,485,895 | B1 | 11/2002 | Choi et al. |
| 6,803,176 | B2 | 10/2004 | Choi et al. |
| 7,085,226 | B1 | 8/2006 | Jung et al. |
| 7,574,226 | B2 | 8/2009 | Takano et al. |
| 7,844,265 | B2 | 11/2010 | Kuchibhotla et al. |
| 7,916,675 | B2 | 3/2011 | Dalsgaard |
| 8,228,829 | B2 | 7/2012 | Sammour et al. |
| 8,270,932 | B2 | 9/2012 | Kim et al. |
| 8,385,878 | B2* | 2/2013 | Rao ................. H04W 56/0035 455/127.5 |
| 8,412,211 | B2* | 4/2013 | Petrovic ............. H04W 48/10 455/452.2 |
| 8,521,139 | B2* | 8/2013 | Vayanos ............... H04L 63/12 455/524 |
| 8,572,250 | B2 | 10/2013 | Rinne et al. |
| 8,682,376 | B2* | 3/2014 | Franceschini ......... H04W 52/08 455/69 |
| 8,818,321 | B2 | 8/2014 | Dalsgaard et al. |
| 9,066,350 | B2 | 6/2015 | Sammour et al. |
| 10,667,211 | B2* | 5/2020 | Sammour ......... H04W 52/0229 |
| 10,728,857 | B2 | 7/2020 | Maeda et al. |
| 2002/0045458 | A1 | 4/2002 | Parantainen et al. |
| 2003/0185162 | A1 | 10/2003 | Fraser et al. |
| 2004/0029596 | A1 | 2/2004 | Kim et al. |
| 2004/0043798 | A1 | 3/2004 | Amerga et al. |
| 2004/0116110 | A1 | 6/2004 | Amerga et al. |
| 2004/0227618 | A1 | 11/2004 | Hwang |
| 2005/0009527 | A1 | 1/2005 | Sharma |
| 2005/0059437 | A1 | 3/2005 | Son et al. |
| 2005/0063304 | A1 | 3/2005 | Sillasto et al. |
| 2005/0111599 | A1 | 5/2005 | Walton et al. |
| 2005/0148348 | A1 | 7/2005 | Gramby |
| 2005/0153751 | A1 | 7/2005 | Sultan et al. |
| 2005/0195852 | A1 | 9/2005 | Vayanos et al. |
| 2006/0029011 | A1 | 2/2006 | Etemad et al. |
| 2006/0094441 | A1 | 5/2006 | Beckmann et al. |
| 2006/0195576 | A1 | 8/2006 | Rinne et al. |
| 2007/0133479 | A1 | 6/2007 | Montojo et al. |
| 2007/0170485 | A1 | 7/2007 | Shimada et al. |
| 2007/0178875 | A1 | 8/2007 | Rao et al. |
| 2007/0183355 | A1 | 8/2007 | Kuchibhotla et al. |
| 2007/0291728 | A1 | 12/2007 | Dalsgaard et al. |
| 2007/0291729 | A1 | 12/2007 | Dalsgaard et al. |
| 2008/0101268 | A1 | 5/2008 | Sammour et al. |
| 2008/0280631 | A1 | 11/2008 | Lee et al. |
| 2009/0260667 | A1 | 10/2009 | Chen et al. |
| 2011/0003600 | A2 | 1/2011 | Beckmann et al. |
| 2012/0170485 | A1 | 7/2012 | Maeda et al. |
| 2022/0046682 | A1 | 2/2022 | Zhang et al. |

FOREIGN PATENT DOCUMENTS

| | | | |
|---|---|---|---|
| EP | 0536099 | A1 | 4/1993 |
| EP | 1841249 | A1 | 10/2007 |
| EP | 2384066 | A1 | 2/2011 |
| JP | 09-037344 | A | 2/1997 |
| JP | 2006-501705 | A | 1/2006 |
| KR | 10-2003-0097373 | A | 12/2003 |
| RU | 2120181 | C1 | 10/1998 |
| TW | 200503571 | A | 1/2005 |
| WO | WO 2004/012359 | A2 | 2/2004 |
| WO | WO 2004/095860 | A1 | 11/2004 |
| WO | WO 2005/117297 | A1 | 12/2005 |
| WO | WO 2007/145006 | A1 | 12/2007 |
| WO | WO 2008/063474 | A2 | 5/2008 |
| WO | WO 97/49201 | A1 | 8/2014 |

OTHER PUBLICATIONS

3rd Generation Partnership Project (3GPP), "Evolved Universal Terrestrial Radio Access (E-UTRA), Medium Access Control (MAC) protocol specification", Release 8, 3GPP TS 36.321 V1.0.0, Sep. 2007, Valbonne, France, 18 pages.

Third Generation Partnership Project (3GPP); R1-061498; "Signaling in support of DTX/DRX", Qualcomm Europe; 3GPP TSG-RAN WG 1 #45, May 8-May 12, 2006, Shanghai, China, 11 pages.

Third Generation Partnership Project (3GPP); R2-052786; "LTE-MAC activity control method", CATT; 3GPP TSG RAN WG2 meeting #49, Nov. 7-11, 2005, Seoul, Korea, 2 pages.

Third Generation Partnership Project (3GPP); R2-060967; "DRX and DTX in LTE Active", Ericsson; 3GPP TSG-RAN WG2 Meeting #52, Mar. 27-31, 2006, Athens, Greece, 5 pages.

Third Generation Partnership Project (3GPP); R2-061299; "Signaling in support of DTX-DRX", Qualcomm Europe, Nokia; 3GPP TSG-RAN WG2 Meeting #53, May 8-12, 2006, Shanghai, China, 4 pages.

Third Generation Partnership Project (3GPP); R2-062778; "DRX operations for connected mode UEs in LTE"; Samsung; 3GPP TSG-RAN2 Meeting #55, Oct. 9-13, 2006, Seoul, Korea, 3 pages.

Third Generation Partnership Project (3GPP); R2-062819; "Adaptive DRX and DTX Setting for LTE_Active", Siemens; 3GPP TSG-RAN WG2#55; Oct. 9-13, 2006, Seoul, Korea, 2 pages.

3rd Generation Partnership Project (3GPP), R2-040415, "MTCH Discontinuous Transmission and Reception", LG Electronics, TSG-RAN Working Group 2 #41, Malaga, Spain, Feb. 16-20, 2004, pp. 1-7.

3rd Generation Partnership Project (3GPP), R2-060888, "DRX and DTX Operation in LTE Active", Panasonic, 3GPP TSG-RAN WG2 Meeting #52, Athena, Greece, Mar. 27-31, 2006, 3 pages.

3rd Generation Partnership Project (3GPP), R2-061200, "Paging for LTE", Qualcomm Europe, 3GPP TSG-RAN WG 2 Meeting #53, Shanghai, China, May 8-12, 2006, pp. 1-3.

3rd Generation Partnership Project (3GPP), R2-061981, "Paging in RRC_Connected State", ETRI, 3GPP TSG RAN WG2 ad-hoc on LTE, Cannes, France, Jun. 27-30, 2006, pp. 1-3.

3rd Generation Partnership Project (3GPP), R2-062027, "Text Proposal on Clarification on Difference of RRC and MAC Control", NTT DoComo, Inc., 3GPP TSG RAN WG2 Ad Hoc on LTE, Cannes, France, Jun. 27-30, 2006, 2 pages.

3rd Generation Partnership Project (3GPP), R2-062753, "Active Mode DRX Details", Nokia, 3GPP TSG-RAN WGx Meeting #55, Seoul, Korea, Oct. 9-13, 2006, 10 pages.

(56) References Cited

OTHER PUBLICATIONS

3rd Generation Partnership Project (3GPP), TS 25.321 V6.10.0, "Technical Specification Group Radio Access Network, Medium Access Control (MAC) Protocol Specification (Release 6)", Sep. 2006, pp. 1-91.
3rd Generation Partnership Project (3GPP), TS 36.300 V8.2.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Sep. 2007, pp. 1-109.
3rd Generation Partnership Project (3GPP), TS 36.300 V0.1.0, "Technical Specification Group Radio Access Network, Evolved Universal Terrestrial Radio Access (E-UTRA) and Evolved Universal Terrestrial Radio Access Network (E-UTRAN), Overall description, Stage 2 (Release x)", 2006, pp. 1-57.
3rd Generation Partnership Project (3GPP), R2-071285, "DRX parameters in LTE", 3GPP TSG RAN WG2, Meeting #57bis, Nokia, St. Julian's, Malta, Mar. 26-30, 2007, 7 pages.
3rd Generation Partnership Project (3GPP); Tdoc-R2-074261, "Open issues on DRX", Samsung, 3GPP TSG-RAN2, Meeting #59bis, Shanghai, China, Oct. 8-12, 2007, 4 pages.
3rd Generation Partnership Project (3GPP); R2-074562, "Way Forward for DL HARQ operation with DRX", 3GPP TSG-RAN WG2, Meeting #59bis, Shanghai, China, Oct. 8-12, 2007, 3 pages.
3rd Generation Partnership Project (3GPP), Tdoc R2-060540, "DRX/DTX operation for LTE Rrc active and LTE Idle state", 3GPP TSG RAN WG2, Meeting #51, ETRI, Denver, USA, Feb. 13-17, 2006, 3 pages.
3rd Generation Partnership Project (3GPP), Tdoc R2-062198, "MAC-controlled Trigger for Initiation and Termination of CPC Mode in Uplink" Infineon, 3GPP TSG-RAN WG2, Meeting #54, Tallinn, Estonia, Aug. 28-Sep. 1, 2006, 5 pages.
3rd Generation Partnership Project (3GPP); R2-062968, "Issue on packet reordering", LG Electronics, TSG-RAN Working Group 2, Meeting #55, Seoul, Korea, Oct. 9-13, 2006, 2 pages.
R2-061919, "Clarification on Difference of RRC and MAC Control", NTT DoComo, Inc., 3GPP TSG RAN WG2 Ad Hoc on LTE, Cannes, France, Jun. 27-30, 2006, 3 Pages.
3GPP TS 36.300 V8.12.0, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3rd Generation Partnership Project.
3GPP TS 36.321 V8.12.0, "Technical Specification Group Radio Access Network; Evolved Universal Terrestrial Radio Access (E-UTRA); Medium Access Control (MAC) protocol specification (Release 8)", 3rd Generation Partnership Project.
3GPP TS 36.331 V8.17.0, "Technical Specification Group Radio Access Network; Evolved Universal Terrestrial Radio Access (E-UTRA); Radio Resource Control (RRC); Protocol specification (Release 8)", 3rd Generation Partnership Project.
3GPP TS 38.214 V15.13.0, "Technical Specification Group Radio Access Network; NR; Physical layer procedures for data (Release 15)", 3rd Generation Partnership Project.
3GPP TS 38.300 V15.13.0, "Technical Specification Group Radio Access Network; NR; NR and NG-RAN Overall Description; Stage 2 (Release 15)", 3rd Generation Partnership Project.
3GPP TS 38.321 V15.12.0, "Technical Specification Group Radio Access Network; NR; Medium Access Control (MAC) protocol specification (Release 15)", 3rd Generation Partnership Project.
3GPP TS 38.331 V15.14.0, "Technical Specification Group Radio Access Network; NR; Radio Resource Control (RRC) protocol specification (Release 15)", 3rd Generation Partnership Project.
Examination Decision on Request for Invalidation, Chinese Patent No. 200780039414.3, Case No. 4W114159, Reexamination and Invalidation Examination Department of the National Intellectual Property Administration of the People's Republic of China, Issued Nov. 2, 2022; 42 pages.
Third Generation Partnership Project (3GPP), "Technical Specification Group Radio Access Network", 3rd Generation Partnership Project; NR; Physical layer procedures for control (Release 16), 3GPP TS 38.213 V16.12.0, Dec. 2022, 191 pages.
Third Generation Partnership Project (3GPP), "Technical Specification Group Radio Access Network", 3rd Generation Partnership Project; NR; Medium Access Control (MAC) protocol specification (Release 16), 3GPP TS 38.321 V16.2.1, Sep. 2020, 154 pages.
Third Generation Partnership Project (3GPP), Technical Specification Group Radio Access Network; "Evolved Universal Terrestrial Radio Access (E-UTRA) and Evolved Universal Terrestrial Radio Access Network (E-UTRAN); Overall description", Stage 2, (Release x), 3GPP TS 25.xxx, V0.0.4, R2-062756, Aug. 2006, 41 pages.
Third Generation Partnership Project (3GPP), "DRX Control in LTE_Active", ETRI, 3GPP TSG RAN WG2 #56bis, R2-070120, Sorrento, Italy, Jan. 15-19, 2007, pp. 1-2.
Third Generation Partnership Project (3GPP), "Two-layer CQI Scheme for Improved PUCCH Efficiency", 3GPP TSG-RAN WG2 Meeting #58bis, R2-072584, Orlando, U.S.A., Jun. 25-29, 2007, 6 pages.
Third Generation Partnership Project (3GPP), R2-073284, "DRX Considerations", 3GPP TSG-RAN WG2 Meeting #59 Athens, Greece R2-072455, Aug. 20-24, 2007, 5 pages.
JP 09-37344 A, Cited in Office Action dated Jun. 7, 2013, issued in related Japanese Patent Application No. 2009-534678.
Examination Decision on Request for Invalidation, Chinese Patent No. 200780039414.3, Case No. 4W114159, English translation provided.

* cited by examiner

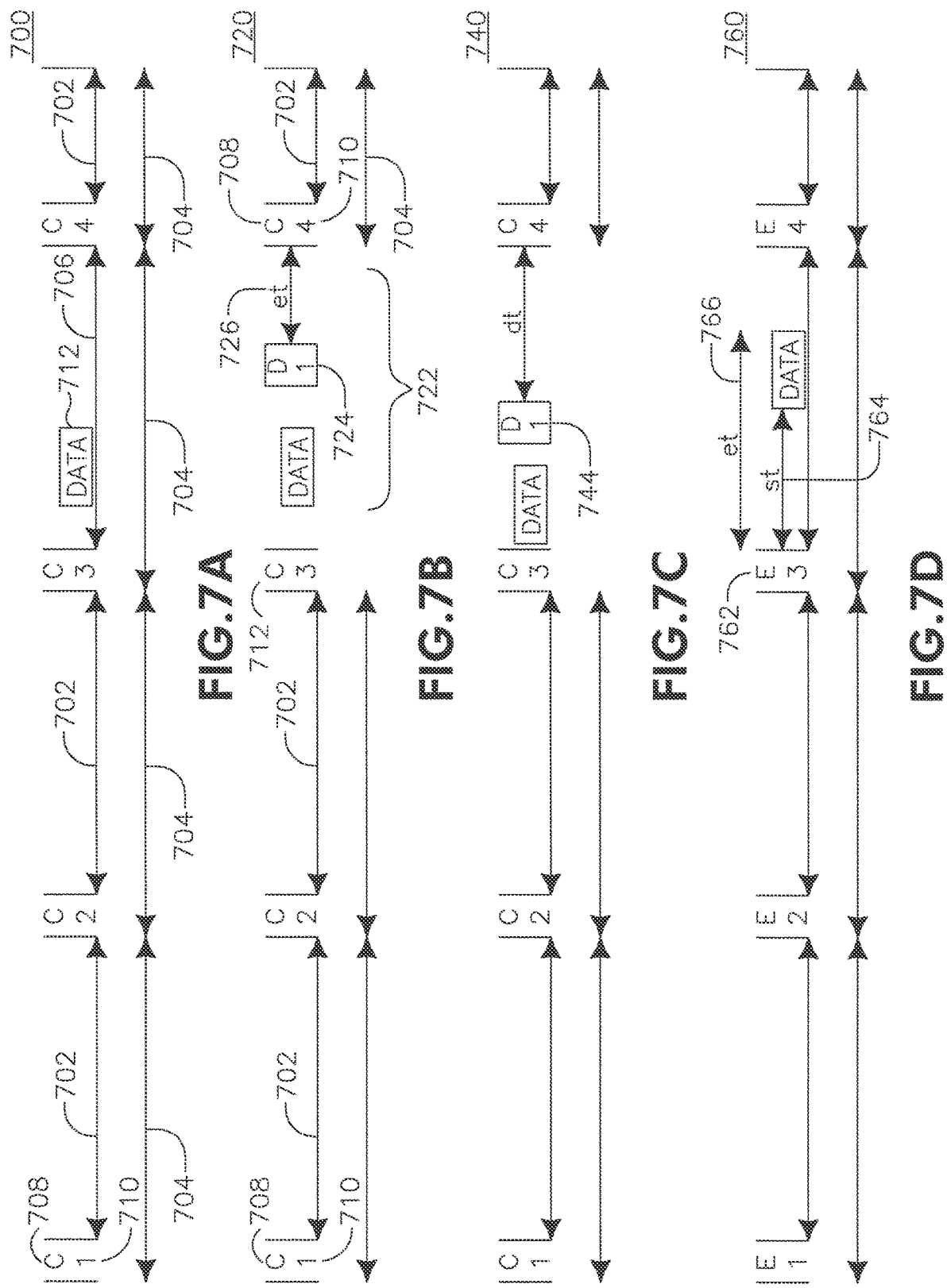

METHOD AND APPARATUS FOR ENHANCING DISCONTINUOUS RECEPTION IN WIRELESS SYSTEMS

CROSS REFERENCE TO RELATED APPLICATIONS

This application is a continuation of U.S. patent application Ser. No. 18/156,738, filed Jan. 19, 2023, which is a continuation of U.S. patent application Ser. No. 16/848,613, filed Apr. 14, 2020, which issued as U.S. Pat. No. 11,678,263 on Jun. 13, 2023, which is a continuation of U.S. patent application Ser. No. 16/163,290, filed Oct. 17, 2018, which issued as U.S. Pat. No. 10,667,211 on May 26, 2020, which is a continuation of U.S. patent application Ser. No. 15/336,258, filed Oct. 27, 2016, which issued as U.S. Pat. No. 10,165,606 on Dec. 25, 2018, which is a continuation of U.S. patent application Ser. No. 14/717,145, filed May 20, 2015, which issued as U.S. Pat. No. 9,510,390 on Nov. 29, 2016, which is a continuation of U.S. patent application Ser. No. 13/526,104, filed Jun. 18, 2012, which issued as U.S. Pat. No. 9,066,350 on Jun. 23, 2015, which is a continuation of U.S. patent application Ser. No. 11/924,484, filed Oct. 25, 2007, which issued as U.S. Pat. No. 8,228,829, on Jul. 24, 2012, which claims the benefit of U.S. Provisional Patent Application No. 60/863,185, filed Oct. 27, 2006, the entire contents of which are hereby incorporated by reference herein.

FIELD OF INVENTION

The present invention relates to wireless communication systems. More particularly, a method and apparatus is disclosed for enhancing discontinuous reception (DRX) in wireless systems.

BACKGROUND

A goal of the Long Term Evolution (LTE) program of the Third Generation Partnership Project (3GPP) is to bring new technology, network architecture, configurations and applications and services to wireless networks in order to provide improved spectral efficiency, reduced latency, faster user experiences and richer applications and services with less cost. LTE's aim is to create an Evolved Universal Terrestrial Radio Access Network (E-UTRAN).

In an LTE compliant network, discontinuous reception (DRX) operation is used by a wireless transmit/receive unit (WTRU) to save power. DRX allows the WTRU to sleep during regular intervals and wake up at specific time instances to verify if the network has data for it.

FIG. 1 shows a typical protocol stack architecture for an LTE network in accordance with the prior art. The system may include a WTRU 102, an e Node-B (eNB) 104 and an access gateway (aGW) 106. A non access stratum (NAS) protocol 108 and a packet data convergence protocol 110 (PDCP) may reside in the WTRU 102 and the aGW 106 to allow for communication between the devices. A radio resource control (RRC) protocol 112, a radio link control (RLC) protocol 114, a medium access control (MAC) protocol 116 and a physical layer (PHY) 118 may reside in both the WTRU 102 and the eNB 104 to allow for communications between those devices.

The RRC protocol 112 may operate in two states: RRC_IDLE and RRC_CONNECTED. While in RRC_IDLE state the WTRU DRX cycle is configured by signaling over the NAS protocol 108. This state includes system information broadcasts, paging, and cell resection mobility. A WTRU in RRC_IDLE state preferably is allocated an ID number that identifies the WTRU in a tracking area. No RRC protocol context is stored in an eNB.

In the RRC_CONNECTED state, the WTRU may make a connection with an E-UTRAN. The E-UTRAN knows the cell to which the WTRU belongs to so that the network can transmit and receive data to/from the WTRU. In the RRC_CONNECTED state, the network controls mobility (handover) and the WTRU conducts neighbor cell measurements. Furthermore, at the RLC/MAC level, a WTRU can transmit data to, and receive data from, the network and monitors a control signaling channel for a shared data channel to see if any transmission over the shared data channel has been allocated to the WTRU. The WTRU also reports channel quality information and feedback information to the eNB. A DRX/discontinuous transmission (DTX) period can be configured according to WTRU activity level for power saving and efficient resource utilization. This is typically under control of the eNB.

The NAS protocol 108 may operate in an LTE_DETACHED state, in which there is no RRC entity. The NAS protocol 108 may also operate in an LTE_IDLE state. Also, the NAS protocol 108 may operate in an RRC_IDLE state, while in LTE_DETACHED state, during which some information may be stored in the WTRU and in the network, such as IP addresses, security associations, WTRU capability information and radio bearers. Decisions regarding state transitions are typically decided in the eNB or the aGW.

The NAS protocol 108 may also operate in an LTE_ACTIVE state, which includes an RRC_CONNECTED state. In this state, state transitions are typically decided in the eNB or the aGW.

DRX may be activated in LTE_ACTIVE state, which corresponds to the RRC_CONNECTED state. Some of the services that would run in the LTE_ACTIVE state are those services generating small packets on a regular basis, such as VoIP. Also, those services generating delay insensitive bulk packets on an infrequent basis, such as FTP, may run in the LTE_ACTIVE, as well as those services generating small packets on a rare basis, such as presence service.

Based on the characteristics of the aforementioned services, data transmission/reception may be performed during DRX operation without RRC signaling. Also, a DRX cycle length should be long enough for battery power savings. Furthermore, the amount of data transmitted within a DRX cycle should be variable from cycle by cycle. For example, DRX for FTP service may allow an increase in the amount of data for each DRX cycle.

FIG. 2 shows a DRX signal structure 200 in accordance with the prior art. An active period 202 is the period during when a WTRU's transmitter/receiver is turned on and a sleep period 204 is the period during when a WTRU's transmitter/receiver is turned off. A DRX cycle length 206 is the time distance between consecutive active period start positions.

The DRX cycle length 206 may be determined by the network, considering the quality of service (QoS) requirements of a service activated in the WTRU. Active period start positions should be unambiguously identified by both the WTRU and the eNB.

At an active period start position, the WTRU may monitor an L1/L2 control channel during a predefined time interval to see whether there is incoming data. A length of the active period 202 may be variable, depending on the amount of data to be transmitted during the DRX cycle 206. An end position of active period 202 may be explicitly signaled by the eNB or implicitly assumed after inactivity of the predefined time interval. Uplink data transmission can be initiated anytime during the sleep period 204. Active period uplink data transmission may end when the uplink transmission is completed.

FIG. 3 is a signal diagram of a two layer DRX signaling scheme 300 in accordance with the prior art. The two layer method may be used to support flexible DRX and includes splitting the DRX signals into high level and low level. Referring to FIG. 3, a high level DRX signal 302 is controlled by the RRC. The high level DRX interval 306 depends upon the basic flow requirements of the connection, for example, voice over IP, web browsing, and the like. The high level DRX interval 306 is preferably determined by the RRC in the eNB and is signaled to the WTRU using RRC control signaling.

A low level DRX signal 304 is signaled by the MAC layer. A low level DRX interval 308 is flexible and may support fast changes in the DRX interval. A MAC header may carry information regarding low level settings.

Dependence between the high level DRX 302 and low level DRX 304 should be at a minimum because the high level DRX interval 306 can be used as fallback DRX interval in case of any errors occur applying the lower level DRX interval 308. The network and the WTRU preferably are synchronized with the high layer DRX interval 306.

The relatively long high level DRX interval 306 is beneficial for WTRU power savings, but limits downlink (DL) scheduling flexibility and throughput. If there is a significant amount of data buffered in an eNB or WTRU transmission buffer, it may be beneficial to change the short low level DRX interval 308 for a period of time suitable for the transmission of the buffered data. After the data transmission, the WTRU and the eNB could resume the high level DRX interval 302.

As shown in Table 1, DRX may be split between regular signals and interim signals.

TABLE 1

Active mode DRX control signaling

|  | RRC | MAC |
|---|---|---|
| Regular DRX control | X |  |
| Interim DRX control |  | X |

Signaling DRX in the RRC is based on the regularity of the basic connection requirements and may result in a regular DRX signal ensuring the requirements of the connection. Regular DRX is determined in the eNB. A WTRU should know, through RRC signaling, to apply regular DRX. In other words, when a WTRU enters active mode, one of the RRC parameters delivered to the WTRU will be the regular DRX parameters to be applied. While in active mode the eNB can change, at any point in time and through RRC signaling, the regular DRX parameters used by the WTRU.

FIG. 4 shows RRC signaling for regular DRX 400 in accordance with the prior art. An eNB 406 transmits an RRC signal 404 to a WTRU 402. The RRC signal 404 includes a regular DRX request. The WTRU 402 responds to the eNB 406 with an RRC signal 408 indicating that the WTRU received the regular DRX request.

MAC layer DRX may be able to handle fast and irregular changes such as, for example, an instantaneous increase of data throughput. The MAC layer interim DRX may be temporary. Interim DRX settings preferably are determined in the eNB. A WTRU acquires information regarding which interim DRX parameters to apply through MAC signaling. MAC signaling from the eNB to the WTRU may include interim DRX information. The WTRU may apply the interim DRX according to network instructions. Applying interim DRX does not affect the regular DRX interval. When a WTRU no longer applies interim DRX it will resume regular DRX.

FIG. 5 shows MAC signaling 500 for regular DRX in accordance with the prior art. An e Node-B 506 transmits a MAC signal 504 to a WTRU 502. The WTRU 502 responds to the eNB 506 with a hybrid automatic retransmit request (HARM) process 508.

SUMMARY

A method and apparatus for discontinuous reception (DRX) in a wireless transmit receive unit (WTRU) is disclosed. The method preferably includes a WTRU receiving DRX setting information over a radio resource control (RRC) signal, and the WTRU receiving DRX activation information over medium access control (MAC) signal. The method may also include the WTRU grouping DRX setting information into a DRX profile and determining a DRX profile index associated with the DRX profile. The method may also include the WTRU, in a DRX minimum active period, receiving a data indication signal from an eNB and remaining in an active period based on the data indication signal.

BRIEF DESCRIPTION OF THE DRAWINGS

A more detailed understanding may be had from the following description, given by way of example and to be understood in conjunction with the accompanying drawings wherein:

FIG. 7a is a signal diagram of DRX operation in accordance with one embodiment;

FIG. 7b is a signal diagram of DRX operation in accordance with an alternative embodiment;

FIG. 7c is a signal diagram of DRX operation in accordance with another embodiment; and FIG. 7d is a signal diagram of DRX operation in accordance with yet another embodiment.

DETAILED DESCRIPTION OF THE EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Two layer DRX operation may include a regular DRX operation controlled by RRC signaling and an interim DRX operation controlled by MAC signaling. The use of RRC signaling takes advantage of the reliability and robustness of RRC signaling in general. Reliability is achieved via response or acknowledgement messages that are generated at the RRC layer or via the use of the acknowledged mode (AM) service of the RLC layer. Also, ciphering and integrity protection are required for RRC signaling, thus making an RRC signal a reliable signal.

A MAC signal is used for speed. MAC signaling is generally faster to generate and to process than RRC signaling. Interim DRX operations that use MAC signaling may be flexible, but do not include the reliability and security aspects that are provided in RRC signaling and not MAC signaling.

DRX signaling information can be classified into two categories: 1) DRX settings, parameters or configurations, such as DRX cycle periodicity, for example, and 2) DRX activation commands, such as to turn DRX on or off, for example.

The DRX settings, parameters or configuration information is preferably signaled reliably, robustly and securely. Interim DRX RRC signaling parameters and configuration information may be communicated via RRC signaling. However, DRX activation commands that, for example, instruct the WTRU to enter DRX mode, are preferably signaled quickly via MAC signaling. For example, the commands to enter or exit interim DRX are signaled via MAC signaling.

In an alternative, some DRX settings, parameters, or configuration information may be signaled with the DRX activation commands.

Figure 1:
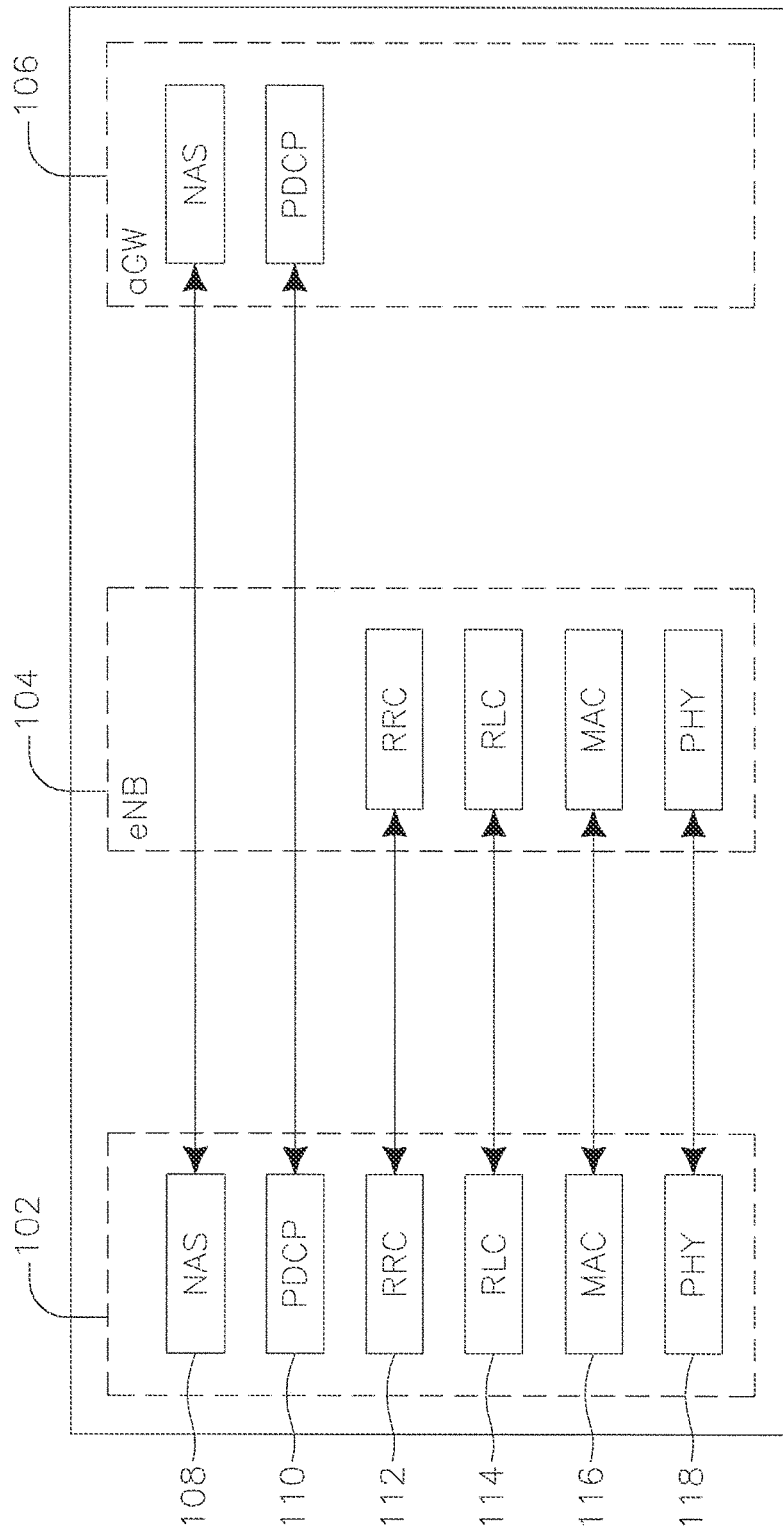
FIG. 1 shows a typical protocol stack architecture for an LTE network in accordance with the prior art.
Figure 2:
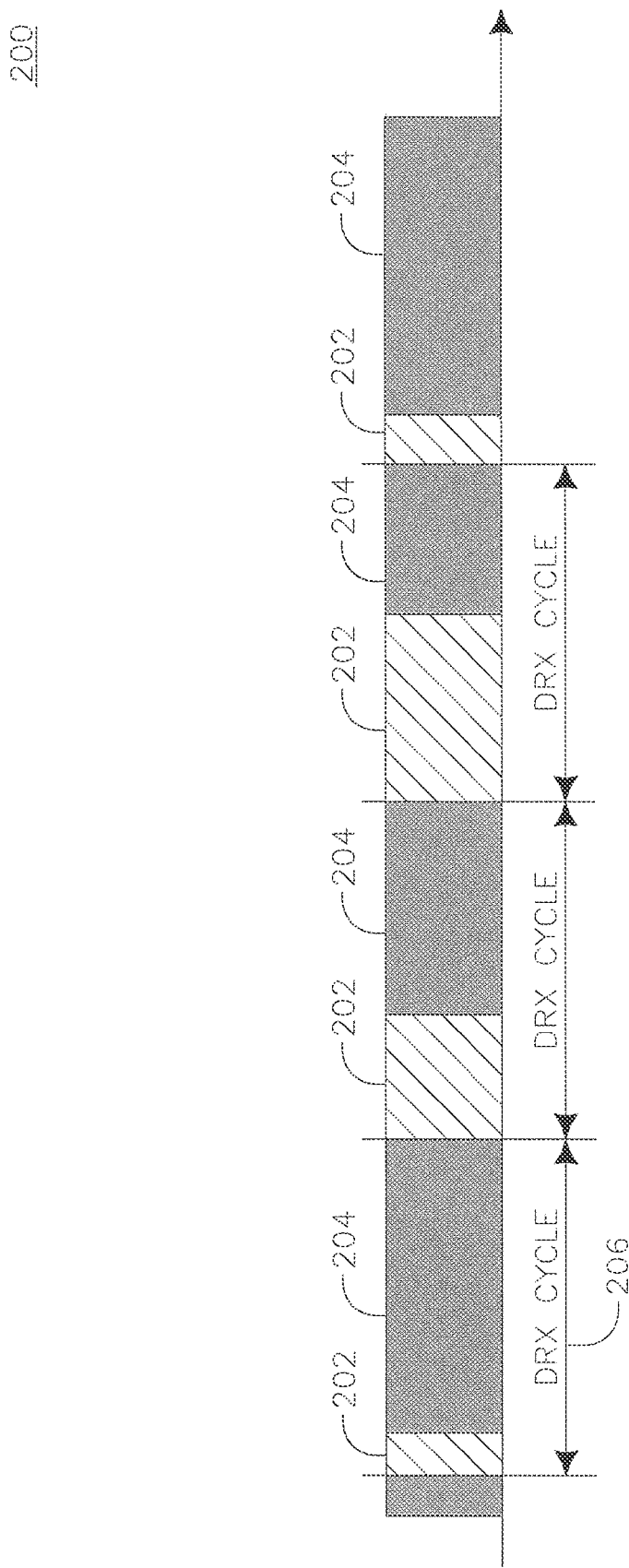
FIG. 2 shows a DRX signal structure in accordance with the prior art.
Figure 3:
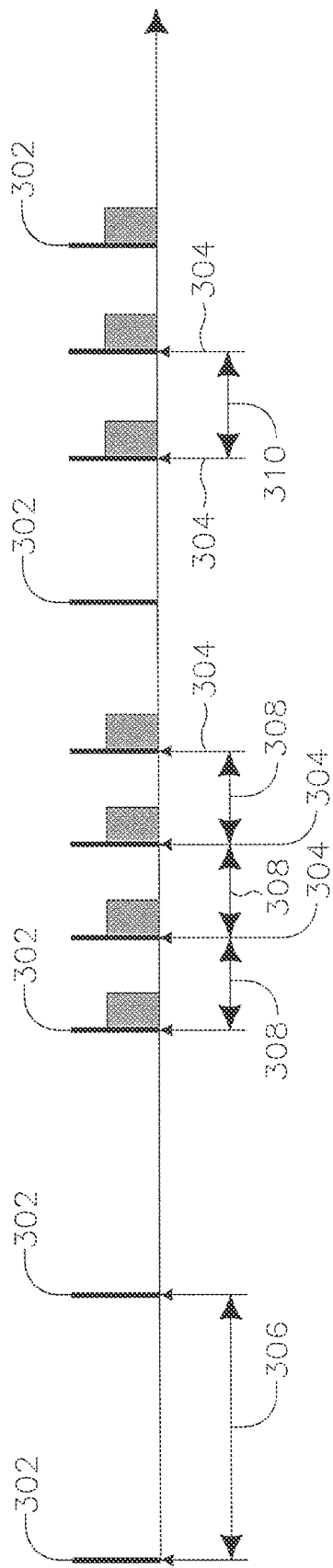
FIG. 3 FIG. 3 is a signal diagram of a two layer DRX signaling scheme in accordance with the prior art.
Figure 4:
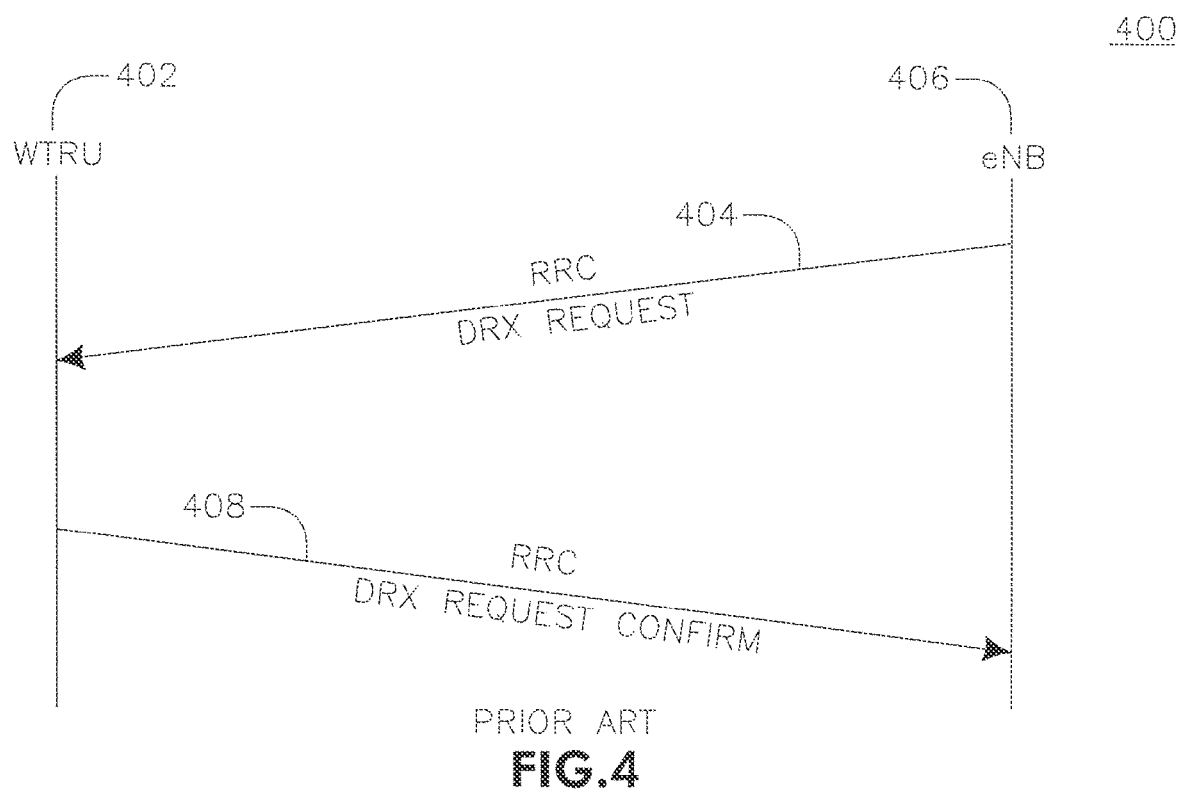
FIG. 4 shows regular DRX signaling in accordance with the prior art.
Figure 5:
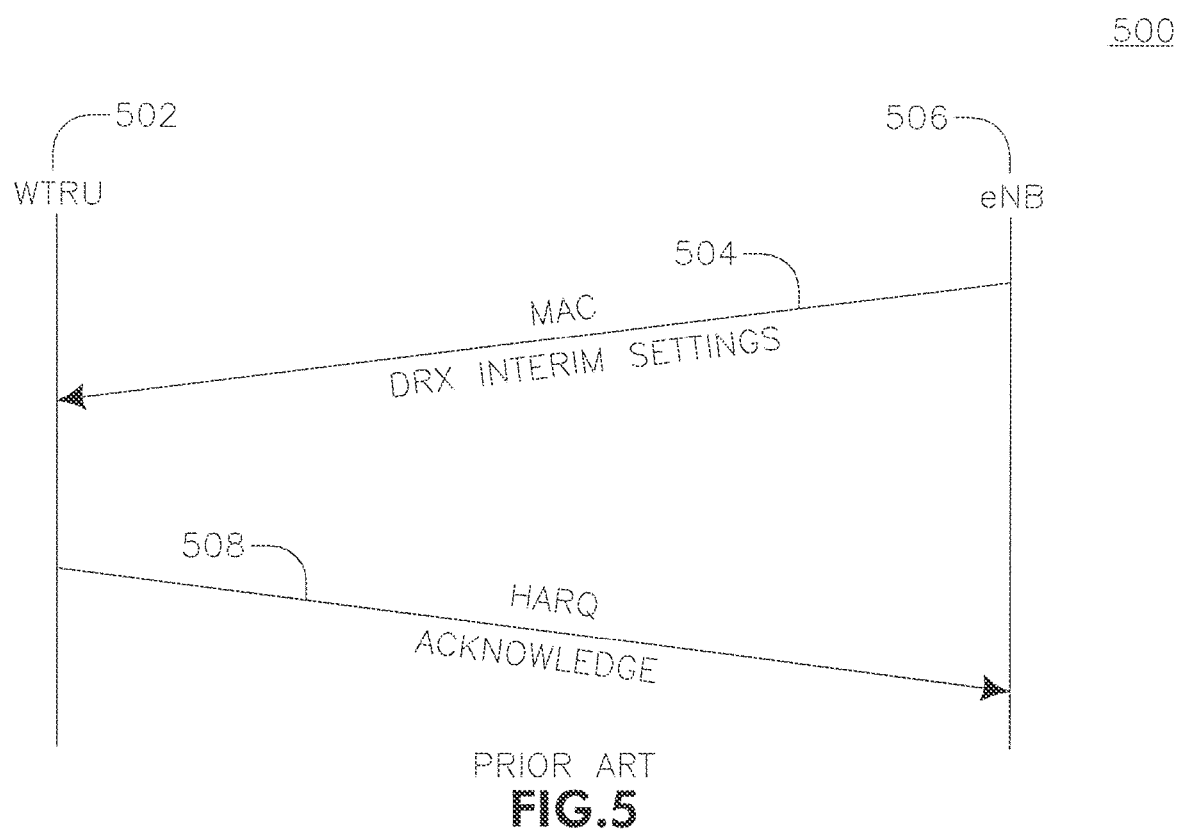
FIG. 5 shows interim DRX signaling in accordance with the prior art.
Figure 6A:
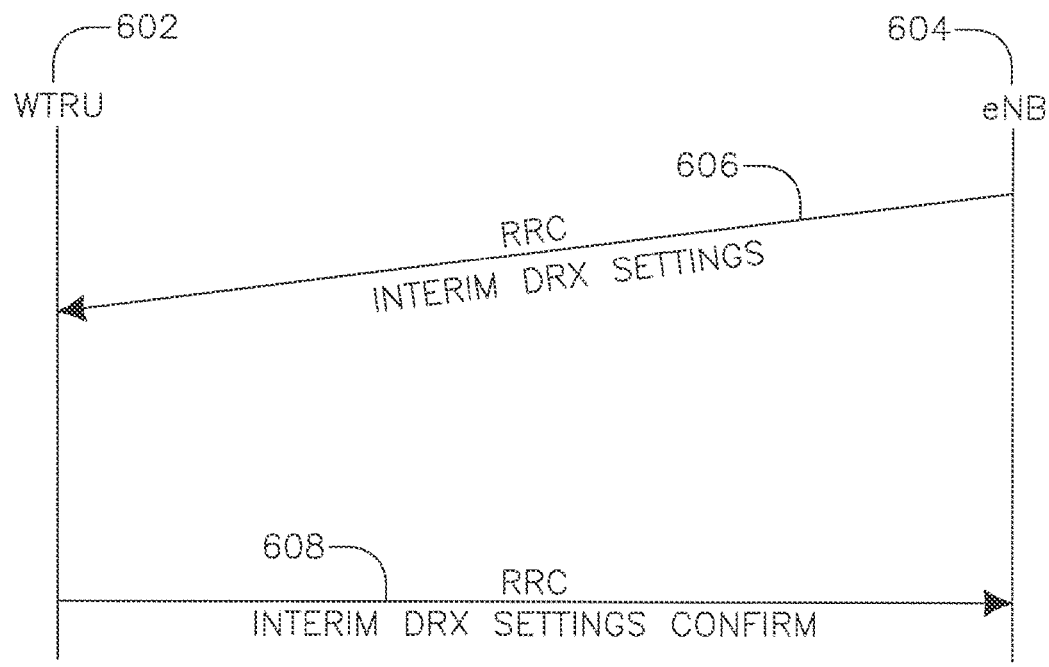
FIG. 6A shows DRX settings information signaling in accordance with one embodiment.

FIG. 6A shows interim DRX setting signaling in accordance with one embodiment. Interim DRX setting information may be conveyed using RRC messages. A WTRU 602 receives an RRC signal 606 containing interim DRX setting information from an eNB 604. The WTRU 602 may respond to the eNB 604 with a confirmation signal 608.

Figure 6B:
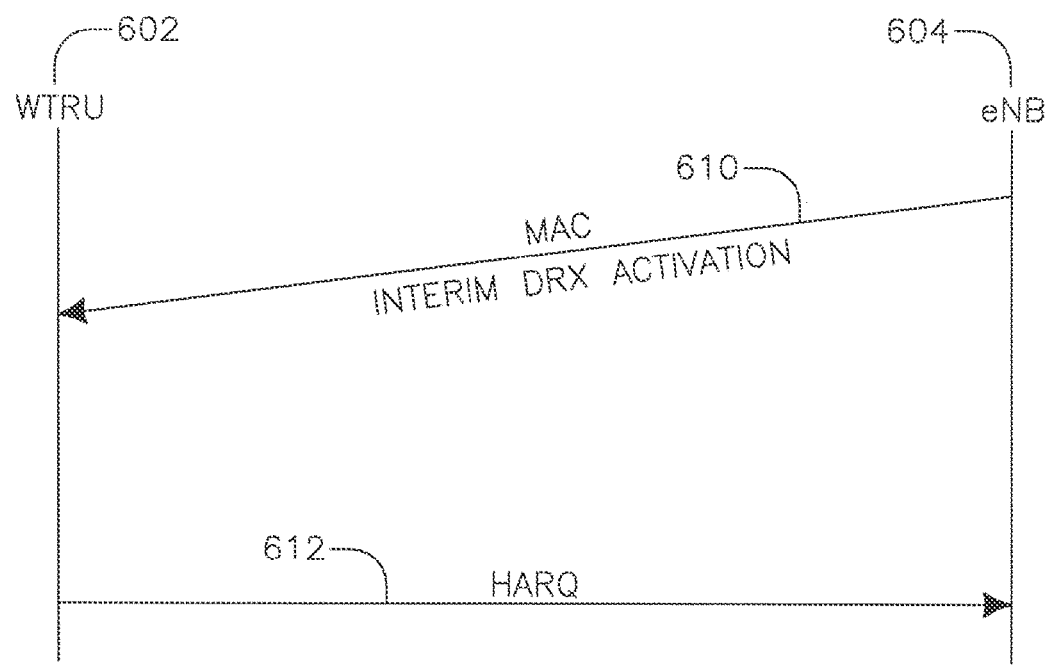
FIG. 6B shows DRX activation information signaling in accordance with one embodiment.

FIG. 6B shows interim DRX activation signaling in accordance with one embodiment. The interim DRX activation signals are conveyed using MAC signals. The WTRU 602 receives a MAC signal 610 containing interim DRX activation information from an eNB 604. The WTRU 602 may respond to the eNB 604 with a hybrid automatic repeat request (HARM) signal 612.

Sets of DRX setting information can be grouped to form a DRX profile. A DRX Profile ID may be used to indicate the DRX profile. RRC signaling may be used to define a DRX profile and attach it to a DRX Profile ID. The DRX profile may be used with interim DRX, regular DRX, or any other DRX mode. Once the profiles are setup or preconfigured, an eNB and a WTRU may exchange DRX activation commands that may reference an appropriate DRX Profile ID for the WTRU. The activation commands may be RRC signals, but are preferably MAC signals.

The WTRU may dynamically apply the DRX parameter information in a particular DRX profile using MAC signaling that makes reference to the DRX profile ID, rather than having to specify and detail all DRX parameters. An interim DRX activation signal may reference a DRX Profile ID, or may contain some DRX settings that were not included in the RRC signaling. This signaling method may be applied to any level DRX or any type of DRX operation in general.

A DRX cycle may contain an active period and a sleep period. The active period start positions may be unambiguously identified by both a WTRU and an eNB, while the active period length may be variable and depend on an amount of data to be transmitted during the DRX cycle.

A DRX signaling message may specify an activation time or a start time that is used to indicate a time to activate the DRX cycle or enter into DRX mode. An activation time can be indicated in absolute terms, or relative to the present time, to ensure that the both the WTRU and the eNB unambiguously identify the start of the DRX cycle. MAC or RRC signaling messages used for DRX may include a DRX activation or start time.

A WTRU may remain in an awake DRX mode for a minimum active period. The minimum active period preferably is communicated in a DRX signaling message, either RRC or MAC, or it can be predefined. The minimum active period may be used for a number of activities. For example, it may be used to increase DRX flexibility, increase DRX robustness, or ensure that if a WTRU has missed some transmissions it will stay awake to receive them in an expedited manner.

DRX structure may be defined periodically, for example, one DRX cycle every 50 msec. In order to increase the flexibility of DRX, another mode of DRX operation may be utilized whereby a DRX cycle start time is defined during a previous DRX cycle. This mode can be used independent of, or in addition to, the periodic mode of DRX operation. As an example, during the active period of a DRX cycle, once the WTRU has received its intended data and there are no further packets to transmit to that WTRU at the eNB, the eNB may instruct the WTRU via a signaling message, either MAC or RRC, to go to sleep for a predetermined time and/or wake up at a predetermined time.

Additionally, it may be advantageous under certain circumstances to keep the WTRU awake during a DRX cycle instead of allowing it to go to sleep until the next DRX cycle. In order to achieve that, a DRX signaling message, either MAC or RRC, may be used to instruct the WTRU to stay awake until a specified time, such as, the next DRX cycle, for example.

A WTRU may, by default, enter DRX once it is in the active/connected state. As an alternative, signaling messages may be used to exchange capability information regarding whether the WTRU supports DRX operation in the active/ connected state. An eNB may obtain the WTRU's active mode DRX capability and any other parameters associated with such capability. Accordingly, the eNB may instruct the WTRU to go into active mode DRX as it deems necessary.

A WTRU may remain awake for a minimum active period. During this period, the eNB may use Layer 1, Layer 2 or Layer 3 signaling messages to indicate whether data will be transmitted to the WTRU during a particular DRX cycle. The WTRU may stay in the active period until the beginning of the next DRX cycle. The WTRU will not sleep following the reception of its data until the beginning of the next DRX cycle.

The WTRU may wait for an explicit signal from the eNB to indicate the presence of data for a particular WTRU. IF the WTRU does not receive an indication from the eNB, the WTRU may determine that no signal was transmitted or the signal went missing but shall stay awake because there might be something on the downlink for the WTRU FIG. 7A shows a signal diagram for DRX operation 700 in accordance with one embodiment. The DRX cycle 704 includes a minimum active time 710 and a sleep time 702. The WTRU may receive a command 708 in each minimum active time 710. If data is available for the WTRU, the WTRU receives an indication in the command 708, receives the data 712, and stays awake until the next DRX cycle 704.

In an alternative embodiment, if the eNB has not or will not transmit data for the WTRU during this DRX cycle, it does not send the command 708. The WTRU may interpret the lack of command as an indication that it can go back to sleep until the next DRX cycle, as it has no data to receive.

FIG. 7B shows a signal diagram for DRX operation 720 in accordance with another embodiment. The WTRU receives a command 708 during the minimum active time 710 indicating whether there is data for the WTRU. Once the WTRU receives the command that indicates that the eNB is transmitting during the DRX cycle 712, the WTRU exits DRX completely and may disregard its prior DRX operation and configuration. The WTRU may then stay awake in a non-DRX cycle 722. The eNB may use a signaling message 724 to instruct the WTRU to go back into DRX operation at time 726. The signaling can be RRC, MAC, or PHY signaling, and a trigger to generate the signaling can be the detection of idle or inactivity time following a data transmission. Another trigger may be the eNB's knowledge that there are no more packets that need to be transmitted to the WTRU. The WTRU then resumes DRX operation and receives a command 708 during the next minimum active time 710 in the next DRX cycle 704.

FIG. 7C shows a signal diagram for DRX operation 740 in accordance with an alternative embodiment. The DRX signaling message that is used to activate DRX operation 744 may include a periodicity of the DRX cycle; that is, a DRX cycle time), a minimum active time, and a relative or/and absolute time when the WTRU should start or activate the DRX operation. The WTRU may go back into DRX operation at the next DRX cycle, as in FIG. 7B, or after the next DRX cycle occurs, as in FIG. 7C.

A WTRU that is not in DRX mode may send a signaling message to an eNB indicating that the WTRU wants to enter DRX mode. The signaling can be RRC, MAC, or PHY signaling. The WTRU may use a trigger to generate the signaling, such as, the detection of an idle time or inactivity time following the reception of data by the WTRU, for example. There may be other triggers as well. Upon receiving the signaling message, the eNB generates a response signal to instruct the WTRU to go into DRX operation and the DRX settings.

FIG. 7D shows a signal diagram for DRX operation 760 in accordance with another alternative embodiment. A signaling message 762 indicates a relative or absolute time 764 when data transmission will begin and optionally, a relative or absolute time when data transmission will end 766. The WTRU stays in DRX mode.

A DRX cycle is typically associated with a single WTRU. However, for multimedia broadcast/multicast service (MBMS), it is difficult to broadcast to multiple WTRUs that have different DRX cycles. Therefore, an eNB or a radio access network (RAN) may define an "MBMS DRX" cycle that is common for a group of WTRUs. One-to-one signaling messages can be exchanged between the eNB and a WTRU to set up and confirm the MBMS DRX cycle. In an alternative embodiment, the MBMS DRX cycle can be set up via multicast or broadcast messages, for example, on a broadcast channel. In another alternative embodiment, the MBMS DRX cycle can be implicit or derived from a predetermined MBMS scheduling pattern. A WTRU may power down its MBMS transceiver during an MBMS DRX cycle.

It is preferable to coordinate between the MBMS traffic or the MBMS DRX cycle and the WTRU's normal DRX cycle. For example, MBMS traffic can be scheduled with the DRX cycle of the WTRU. This scheme may be less flexible if there are many WTRUs involved in MBMS that have different DRX cycles, but may lead to increased efficiency since the WTRU will have aligned DRX and MBMS intervals.

During DTX, a WTRU transmits during pre-determined intervals, and sleeps during the rest. Coordination between DTX and DRX may be utilized, and the DRX and DTX intervals/cycles may coincide as much as possible, in order to allow maximum efficiency in power consumption. For example, uplink resource assignment can be performed periodically. Aligning the uplink resource assignment with the DRX period may result in greater efficiency. In particular, periodic thin channel assignments can coincide with the DRX cycle.

System messages related to handover are critical. If a DRX cycle is too long, a WTRU may react too late to handover commands, which can cause complete failure of transmission and reception. Accordingly, the handover timing should be a consideration when the DRX cycle is determined, adjusted and signaled by an eNB.

For example, when a WTRU is close to a cell edge a measurement cycle may be required to be shorter than the normal DRX cycle in LTE active mode. Therefore, a signaling message may be sent to the WTRU to reconfigure the DRX cycle to reflect the WTRU being close to a cell edge.

Additionally, when a neighbor cell's measurements are strong, meaning it is a high probability that handover may occur, the DRX cycle should be turned off by the eNB by sending a signaling message or command to the WTRU. The WTRU may continuously monitor its own and its neighbor cell's reference signal, to, for example, prepare autonomous timing adjustment, or to prepare for any handover related activity. In general, when the serving cell's signal strength or transmission quality indicator is below a certain threshold, the WTRU preferably is not be put into DRX mode in order to give the WTRU a better chance to make measurements and try and sustain the call.

WTRU mobility aspects may also be a factor in determining the DRX cycle in LTE active mode. Separate DRX settings may be implemented for different services, such as VoIP, web browsing traffic and the like. A WTRU may have multiple separate or independent DRX cycles for each of the services, or a WTRU may have a single DRX cycle whose DRX settings/parameters satisfy the most frequent traffic pattern. If multiple DRX cycles are used, the cycles may be aligned or coincide as much as possible, in order to maximize the potential for power savings.

Although the features and elements are described in the embodiments in particular combinations, each feature or element can be used alone without the other features and elements of the embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magnetooptical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising a processor configured to:
    receive a radio resource control (RRC) message, wherein the RRC message comprises an indication of a discontinuous reception (DRX) minimum active period, wherein an active period of a DRX cycle is of variable length and the DRX minimum active period corresponds to a minimum length of the active period of the DRX cycle if no transmissions are sent to the WTRU during the DRX cycle;
    monitor for a data indication signal during the DRX minimum active period of the DRX cycle;
    remain awake beyond the minimum active period of the DRX cycle based on receiving the data indication signal during the DRX minimum active period of the DRX cycle, wherein the data indication signal comprises an indication of a time when a data transmission will start and when the data transmission will end; and
    receive the data transmission in accordance with the data indication signal.

2. The WTRU of claim 1, wherein the processor is further configured to receive a medium access control (MAC) message, the MAC message comprising a DRX activation signal.

3. The WTRU of claim 2, wherein the processor is further configured to enter a sleep period of a DRX cycle in response to receiving the MAC message.

4. The WTRU of claim 2, wherein the MAC message indicates to the WTRU that no further data will be transmitted to the WTRU during the DRX cycle.

5. The WTRU of claim 2, wherein the WTRU is configured to resume DRX operation based on receiving the MAC message.

6. The WTRU of claim 1, wherein the processor is configured to:
    monitor for a second data indication signal during a DRX minimum active period of a second DRX cycle;
    determine that the second data indication message was not received during the DRX minimum active period of the second DRX cycle; and
    enter a sleep period of the second DRX cycle at an end of the DRX minimum active period of the second DRX cycle based on determining that the second data indication message was not received during the DRX minimum active period of the second DRX cycle.

7. The WTRU of claim 1, wherein the RRC message comprises an indication of a DRX cycle periodicity.

8. The WTRU of claim 1, wherein the RRC message comprises an indication of a DRX cycle start time.

9. The WTRU of claim 1, wherein the time when the data transmission will start and when the data transmission will end indicated in the data indication signal correspond to a relative start time and a relative end time.

10. A method implemented by a wireless transmit/receive unit (WTRU), the method comprising:
    receiving a radio resource control (RRC) message, wherein the RRC message comprises an indication of a discontinuous reception (DRX) minimum active period, wherein an active period of a DRX cycle is of variable length and the DRX minimum active period corresponds to a minimum length of the active period of the DRX cycle if no transmissions are sent to the WTRU during the DRX cycle;
    monitoring for a data indication signal during the DRX minimum active period of the DRX cycle;
    remaining awake beyond the minimum active period of the DRX cycle based on receiving the data indication signal during the DRX minimum active period of the DRX cycle, wherein the data indication signal comprises an indication of a time when a data transmission will start and when the data transmission will end; and
    receiving the data transmission in accordance with the data indication signal.

11. The method of claim 10, further comprising receiving a medium access control (MAC) message, the MAC message comprising a DRX activation signal.

12. The method of claim 11, further comprising entering a sleep period of a DRX cycle in response to receiving the MAC message.

13. The method of claim 11, wherein the MAC message indicates to the WTRU that no further data will be transmitted to the WTRU during the DRX cycle.

14. The method of claim 11, wherein further comprising resuming DRX operation based on receiving the MAC message.

15. The method of claim 10, further comprising:
    monitoring for a second data indication signal during a DRX minimum active period of a second DRX cycle;
    determining that the second data indication message was not received during the DRX minimum active period of the second DRX cycle; and
    entering a sleep period of the second DRX cycle at an end of the DRX minimum active period of the second DRX cycle based on determining that the second data indication message was not received during the DRX minimum active period of the second DRX cycle.

16. The method of claim 10, wherein the RRC message comprises an indication of a DRX cycle periodicity.

17. The method of claim 10, wherein the RRC message comprises an indication of a DRX cycle start time.

18. The method of claim 10, wherein the time when the data transmission will start and when the data transmission will end indicated in the data indication signal correspond to a relative start time and a relative end time.

19. A base station comprising a processor configured to:
    send a radio resource control (RRC) message to a wireless transmit/receive unit (WTRU), wherein the RRC message comprises an indication of a discontinuous reception (DRX) minimum active period, wherein an active period of a DRX cycle of the WTRU is of variable length and the DRX minimum active period corresponds to a minimum length of the active period of the DRX cycle for the WTRU if no transmissions are sent to the WTRU during the DRX cycle;

send a data indication signal to the WTRU during the DRX minimum active period of the DRX cycle, wherein the data indication signal comprises an indication of a time when a data transmission will start and when the data transmission will end; and send the data transmission to the WTRU in accordance with the data indication signal after an end of the DRX minimum active period of the DRX cycle.

20. The base station of claim 19, wherein the processor is further configured to send a medium access control (MAC) message to the WTRU, the MAC message comprising a DRX activation signal, wherein the MAC message indicates to the WTRU that the WTRU is to enter a sleep period of a DRX cycle.

\* \* \* \* \*